United States Patent
Lee et al.

(10) Patent No.: US 9,601,746 B2
(45) Date of Patent: Mar. 21, 2017

(54) METHOD FOR INJECTING ELECTROLYTE

(71) Applicant: LG CHEM, LTD., Seoul (KR)

(72) Inventors: Dong Sub Lee, Daejeon (KR); Sin Young Park, Daejeon (KR); Hang Seob Yoon, Daejeon (KR); Hyun Suk Kim, Daejeon (KR); Jeoung Soo Kim, Daejeon (KR); Sang Bong Nam, Daejeon (KR); Jun Ho Moon, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/653,966

(22) PCT Filed: Jul. 4, 2014

(86) PCT No.: PCT/KR2014/006006
§ 371 (c)(1),
(2) Date: Jun. 19, 2015

(87) PCT Pub. No.: WO2015/002497
PCT Pub. Date: Jan. 8, 2015

(65) Prior Publication Data
US 2016/0036034 A1 Feb. 4, 2016

(30) Foreign Application Priority Data

Jul. 4, 2013 (KR) ........................ 10-2013-0078211

(51) Int. Cl.
| | |
|---|---|
| *H01M 2/36* | (2006.01) |
| *H01M 10/615* | (2014.01) |
| *H01M 10/657* | (2014.01) |
| *H05B 3/16* | (2006.01) |
| *H05B 6/36* | (2006.01) |
| *H01M 10/04* | (2006.01) |

(52) U.S. Cl.
CPC ............ *H01M 2/36* (2013.01); *H01M 10/615* (2015.04); *H01M 10/657* (2015.04); *H05B 3/16* (2013.01); *H05B 6/36* (2013.01); *H01M 10/0422* (2013.01)

(58) Field of Classification Search
CPC .... H01M 2/36; H01M 10/615; H01M 10/657; H01M 10/0422
See application file for complete search history.

(56) References Cited

U.S. PATENT DOCUMENTS

| | | | |
|---|---|---|---|
| 2001/0019052 | A1 | 9/2001 | Sadahira et al. |
| 2004/0170899 | A1 | 9/2004 | Kurimoto et al. |

FOREIGN PATENT DOCUMENTS

| | | |
|---|---|---|
| CN | 1202082 A | 12/1998 |
| CN | 101179121 A | 5/2008 |
| CN | 102646809 A | 8/2012 |

(Continued)

OTHER PUBLICATIONS

Extended European Search Report, issued Oct. 13, 2015, for European Application No. 14819894.8.

*Primary Examiner* — Jane Rhee
(74) *Attorney, Agent, or Firm* — Birch, Stewart, Kolasch & Birch, LLP

(57) ABSTRACT

A method for injecting an electrolyte includes heating a case in which an electrode assembly is accommodated, and injecting an electrolyte into the case after the heating of the case. Here, the heating of the case may include heating the case through high-frequency induction heating using a coil. Also, the coil may have a spiral shape to surround the outside of the case along a longitudinal direction of the case.

3 Claims, 1 Drawing Sheet

(56) References Cited

FOREIGN PATENT DOCUMENTS

| | | | |
|---|---|---|---|
| CN | 102709511 | A | 10/2012 |
| JP | 10-264121 | A | 10/1998 |
| JP | 10-326626 | A | 12/1998 |
| JP | 2003-217672 | A | 7/2003 |
| JP | 2004-303560 | A | 10/2004 |
| KR | 10-2011-0051019 | A | 5/2011 |

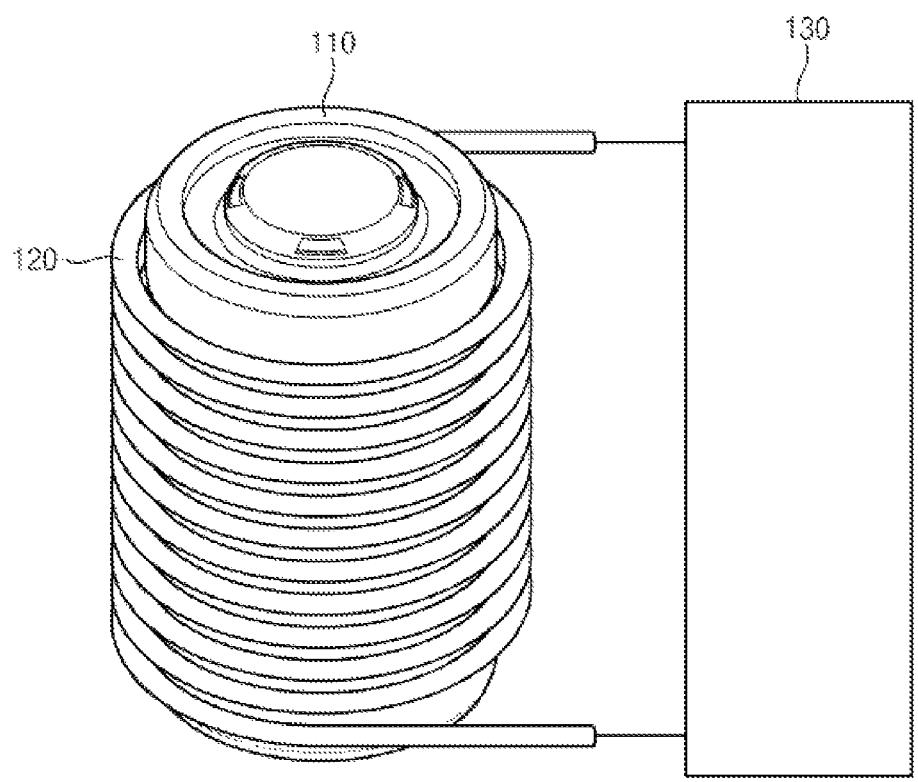

METHOD FOR INJECTING ELECTROLYTE

TECHNICAL FIELD

The present invention relates to a method for injecting an electrolyte, and more particularly, to a method for injecting an electrolyte, which is capable of increasing injectability of the electrolyte without directly heating the electrolyte.

BACKGROUND ART

Batteries are devices in which a cathode electrochemically reacts with an anode to generate electricity. The batteries (for example, lithium ion secondary batteries) may be classified into a stacked type battery, a winding-type (jelly-roll-type) battery, or a stack and folding type battery according to structures of an electrode assembly.

In case of the stacked type battery, each of a cathode, a separator, and an anode is cut into a predetermined size, and then the cut cathode, separator, and anode are sequentially stacked to form an electrode assembly. Here, the separator is disposed between the cathode and the anode. In case of the winding-type battery, a cathode, a separator, an anode, and a separator, each of which has a sheet shape, are sequentially stacked and wound to form an electrode assembly. In case of the stack and folding type battery, a full-cell or a bi-cell is formed and then wound through a separator sheet to form an electrode assembly. Here, each of a cathode, a separator, and an anode is cut into a predetermined size and then sequentially stacked to form the full-cell or the bi-cell (the full-cell or the bi-cell includes at least one cathode, separator, and anode).

Recently, an electrolyte injected into a battery gradually increases in amount and viscosity according to increase in capacity of the battery. However, when an electrolyte increases in amount or viscosity, the electrolyte may be deteriorated in injectability, and thus it may take a long time to inject the electrolyte. This may act as a factor in reducing productivity (mass productivity) of the battery. In order to solve the above-described limitations, a method in which an electrolyte is directly heated to secure fluidity of the electrolyte is being considered. However, according to the above-described method, when the electrolyte is directly heated, the electrolyte may be volatilized to cause an offensive odor.

DISCLOSURE OF THE INVENTION

Technical Problem

An aspect of the present invention provides a method for injecting an electrolyte, which is capable of increasing injectability of the electrolyte without directly heating the electrolyte.

Technical Solution

According to an aspect of the present invention, there is provided a method for injecting an electrolyte includes: heating a case in which an electrode assembly is accommodated; and injecting an electrolyte into the case after the heating of the case. Here, the heating of the case may include heating the case through high-frequency induction heating using a coil. Also, the coil may have a spiral shape to surround the outside of the case along a longitudinal direction of the case.

Advantageous Effects

In the method for injecting the electrolyte according to the embodiment of the present invention, the process of heating the case may be performed, and then the process of injecting the electrolyte into the case may be performed to minimize the occurrence of the volatilization or offensive odor of the electrolyte and increase the injectability of the electrolyte.

Also, in the method for injecting the electrolyte according to the present invention, since the case is heated through the high-frequency induction heating, the case can be quickly and effectively heated to improve the productivity (mass productivity) of the battery.

BRIEF DESCRIPTION OF THE DRAWINGS

FIG. 1 is a perspective view of a device for heating a case so as to apply a method for injecting an electrolyte according to an embodiment of the present invention.

MODE FOR CARRYING OUT THE INVENTION

Exemplary embodiments of the present invention will now be described in detail with reference to the accompanying drawings. However, the present invention is not limited thereto.

The present invention relates to a method for injecting an electrolyte, which is applied to a method for manufacturing a battery such as a lithium ion battery to increase injectability of the electrolyte. In general, a battery such as a secondary battery is manufactured according to following processes. For reference, descriptions that will be described later may vary according to a kind of batteries. First, a process for manufacturing an electrode assembly is performed. The electrode assembly has a structure in which a cathode and an anode face each other with a separator therebetween. The electrode assembly may be classified into a stacked type, a winding type (jelly-roll-type), a stack and folding type, and so on according structures thereof. A method for manufacturing the electrode assembly may slightly vary according to the structures of the electrode assembly.

Next, a process for accommodating the electrode assembly into a case is performed. The case in which the electrode assembly is accommodated may be classified into a prismatic type case, a coin type case, a cylindrical type case, a pouch type case, and so on. A method for accommodating the electrode assembly into the case may slightly vary according to the types of the case. (Since it will be apparent to those skilled in the art that the specific contents are well known, the specific details with respect to the case will be omitted.) Next, a process for injecting the electrolyte into the case is performed. Then, an aging process, a formation process, a degassing process, a sealing process, and so on are performed.

Here, when the electrolyte is heated, the electrolyte increases in temperature, and thus decreases in viscosity. When the electrolyte decreases in viscosity, the electrolyte may be quickly injected. This is done because, when the electrolyte decreases in viscosity, the electrolyte increases in fluidity. Thus, when the electrolyte is heated, that is, the electrolyte increases in temperature, the electrolyte increases in injectability. However, it is not preferable to directly heat the electrolyte. When the electrolyte is directly heated, the electrolyte is volatilized to cause an offensive odor.

The most basic feature of the method for injecting the electrolyte according to an embodiment of the present invention is that the electrolyte is not directly heated, but the case is heated before the electrolyte is injected so as to increase injectability without causing the above-described limitation. That is, the method for injecting the electrolyte according to the current embodiment has a feature in that the process of heating the case is performed, and then the process of injecting the electrolyte into the case is performed.

More particularly, when the electrolyte is injected into the case after the case is heated (here, the electrode assembly such as a jelly-roll in the case may be heated together with the case), the case (or the case and the electrode assembly) gradually decreases in temperature, and thus the electrolyte receives the heat from the case (or the case and the electrode assembly) to gradually increases in temperature. As described above, when the electrolyte is injected, since the electrolyte is indirectly heated through the heated case (or the case and the electrode assembly), the occurrence of the volatilization or offensive odor may be minimized, and also the electrolyte may increase in injectability.

For reference, a case in which the electrolyte is injected into the case while heating the case may be considered. However, in this case, since equipment for injecting the electrolyte has to be coupled to equipment for heating the case, the corresponding equipment may be very complicated in structure. In addition, the equipment may increase in manufacturing costs, thereby increasing manufacturing costs of batteries.

When the case is heated for a relatively long time, a process time for producing a battery may increase. That is, when the case is heated for a long time, the battery may be deteriorated in productivity (mass productivity). Thus, it is necessary to quickly and effectively heat the case. To satisfy this necessity, the case may be heated through high-frequency induction heating. The high-frequency induction heating represents a method in which an object to be heated (hereinafter, referred to as an "object") is placed in a coil, and then high-frequency alternative current flows into the coil to heat the object.

Here, the coil may surround the outside of the case in a spiral shape along a longitudinal direction of the case. This is done because, when the coil surrounds the case, the whole case may be uniformly heated. In particular, when the case has a cylindrical shape, the case may be further uniformly heated through the coil having a spiral shape. That is, as illustrated in FIG. 1, when a case 110 having a cylindrical shape is surrounded by a coil 120 having a spiral shape along a longitudinal direction (a vertical direction in FIG. 1) thereof, distances between the case 110 and the coil 120 may be substantially uniformly maintained, and thus the case 110 may be more uniformly heated.

Also, when the case is uniformly heated, it is very advantageous to increase an internal temperature of the case. Accordingly, since the electrolyte is indirectly heated in the case, an increase in internal temperature of the case may be very important. For reference, as illustrated in FIG. 1, the coil 120 is connected to a control unit 130 and thus controlled in operation thereof. In addition, operation conditions that will be described later may be controlled by the control unit 130.

The method for injecting the electrolyte according to the current embodiment includes a heating process and an injecting process as described above. However, the method for injecting the electrolyte according to the current embodiment may further include a sealing process for sealing a portion of the case or the other processes as occasion demands.

Hereinafter, preferable conditions for heating the case through the high-frequency induction heating will be described in more detail.

First, an internal temperature of the case (or the electrode assembly in the case) may be raised to a temperature of about 40° C. to about 50° C. through high-frequency induction heating. When the internal temperature of the case is less than the temperature of about 40° C., it is not preferable because the electrolyte decreases in viscosity and efficiency. Also, when the internal temperature of the case is greater than the temperature of about 50° C., it is not preferable because a separator or tape of the electrode assembly is contracted or deformed.

For reference, the high-frequency induction heating is a method for heating the object using eddy current generated from the object. Thus, it is difficult to directly heat the inside of the case through the high-frequency induction heating.

That is, when the case is heated through the high-frequency induction heating, a body of the case may be directly heated, and then the inside of the case may be heated through heat transfer. Thus, an external temperature of the case may vary according to a kind of cases even though the cases have the same internal temperature.

Second, the case may be heated for about 5 seconds to about 10 seconds through the high-frequency induction heating. When the high-frequency induction heating is performed under a high-output condition, the case may be quickly heated. However, when the case is quickly heated, a temperature difference between the inside and outside of the case is high. However, when the temperature difference is high, the outside of the case has a temperature higher than that of the inside of the case, and thus a safety accident may occur. On the contrary, when the high-frequency induction heating is performed under a low-output condition, a temperature difference between the inside and outside of the case is low, and thus a safety accident may not occur. However, when the case is heated through the high-frequency induction heating under the low-output condition, the case may have to be heated for a long time, and thus a process rate may be reduced.

Thus, the high-frequency induction heating may be performed without causing the safety accident and reducing the process rate. Thus, the case may be heated for about 5 seconds to about 10 seconds through the high-frequency induction heating. Also, an operating frequency of the high-frequency induction heating may be optimized so that the case is heated for about 5 seconds to about 10 seconds to reach a desired temperature.

What is claimed is:

1. A method for injecting an electrolyte, the method comprising:
 heating a case in which an electrode assembly is accommodated; and
 injecting an electrolyte into the case after the heating of the case,
 wherein the heating of the case comprises heating the case through high-frequency induction heating using a coil,
 wherein the heating of the case comprises raising an internal temperature of the case to a temperature of 40° C. to 50° C. through the high-frequency induction heating, and
 wherein, in the heating of the case, the case is heated for 5 seconds to 10 seconds.

2. The method of claim 1, wherein the coil has a spiral shape to surround the outside of the case along a longitudinal direction of the case.

3. The method of claim 2, wherein the case has a cylindrical shape.

\* \* \* \* \*